United States Patent
Tsai et al.

(10) Patent No.: US 10,773,531 B2
(45) Date of Patent: Sep. 15, 2020

(54) UV INKJET PRINTING METHOD PROVIDING STACKED PRINTING EDGE WITH SMOOTH EFFECT

(71) Applicant: Great Computer Corp., New Taipei (TW)

(72) Inventors: Chen-Chien Tsai, New Taipei (TW); Chih-Hua Yen, New Taipei (TW)

(73) Assignee: GREAT COMPUTER CORP., New Taipei (TW)

( * ) Notice: Subject to any disclaimer, the term of this patent is extended or adjusted under 35 U.S.C. 154(b) by 0 days.

(21) Appl. No.: 16/103,494

(22) Filed: Aug. 14, 2018

(65) Prior Publication Data
US 2020/0055320 A1    Feb. 20, 2020

(51) Int. Cl.
| B41J 2/01 | (2006.01) |
| B41J 11/00 | (2006.01) |
| B41M 7/00 | (2006.01) |
| C09D 11/101 | (2014.01) |
| B05D 7/00 | (2006.01) |

(52) U.S. Cl.
CPC ............ *B41J 11/0015* (2013.01); *B41J 2/01* (2013.01); *B41J 11/002* (2013.01); *B41M 7/0081* (2013.01); *C09D 11/101* (2013.01); *B05D 7/57* (2013.01)

(58) Field of Classification Search
CPC ........ B41J 11/0015; B41J 11/002; B41J 2/01; C09D 11/101; B41M 7/0081; B05D 7/57
See application file for complete search history.

(56) References Cited

U.S. PATENT DOCUMENTS

| 2009/0225143 A1* | 9/2009 | Fukui | B41J 2/2114 347/102 |
| 2009/0244230 A1* | 10/2009 | Ohnishi | B41J 11/002 347/102 |
| 2012/0287189 A1* | 11/2012 | Shimada | B41J 2/2117 347/12 |

* cited by examiner

*Primary Examiner* — Yaovi M Ameh
(74) *Attorney, Agent, or Firm* — Muncy, Geissler, Olds & Lowe, P.C.

(57) ABSTRACT

An ultraviolet (UV) inkjet printing method providing a stacked printing edge with a smooth effect is disclosed. After an inkjet head is controlled to print an image X on a substrate, a distance between the inkjet head and a surface of the substrate is kept unchanged, and the inkjet head is again controlled to print bi-directionally for at least once on the image X. After completing the above steps, the inkjet head is further controlled to print an image X' on the image X on the substrate, wherein the image X' consists of pixels expanded from the image X, such that the image X' completely covers the image X, forming a smooth arc surface at peripheral edges of the image X.

3 Claims, 2 Drawing Sheets

UV INKJET PRINTING METHOD PROVIDING STACKED PRINTING EDGE WITH SMOOTH EFFECT

BACKGROUND OF THE INVENTION

Field of the Invention

The present invention relates to an ultraviolet (UV) inkjet printing method effectively providing a printed product with a smooth edge effect during a stacked printing process.

Description of the Related Art

Ultraviolet (UV) inkjet is capable of printing an object (to be printed) of different materials and thicknesses. In addition to providing a faster printing speed and achieving stable and consistent printing quality, the reliable performance of UV inkjet printing further eliminates the process and time of manufacturing color separation screens and hence completes printing rapidly.

Compared to aqueous and solvent-based and latex ink, UV-curable ink has properties of being curing immediately after reaction takes place and having a certain thickness after curing. Using the above properties, UV ink is often applied to printing products of stacked printing having a stacked thickness for effects such as appearing emergent or similar to 3D printing, e.g., embossing. To enable a printed product to render rich color level variations, when RIP (Raster Image Processor) software is used for color separation, multipass printing scheduling is performed according to an image file size and resolution of an image to be printed, such that an inkjet head prints data to be printed on an printed object repeatedly by several times so as to accomplish inkjet color stacking, thus accumulating printed ink dots of the several printing schedules on the same inkjet position to render an effect of multilevel printing.

However, edges of a printed product produced by common stacking printing schedules are often not smooth enough and may fall short in meeting certain special requirements or applications. In the lack of current commercially available UV 3D or embossing printing techniques capable of eliminating the above printing issues, there is a need for improvement and a corresponding solution in the field of printing technology.

SUMMARY OF THE INVENTION

Therefore, a solution that effectively improves the above printing issues caused by during stacked printing of a UV inkjet printer to further enhance UV inkjet printing quality is much sought-after by a person skilled in the art and users.

It is a primary object of the present invention to provide an ultraviolet (UV) printing method effectively providing a printed product with a smooth edge effect during a stacked printing process.

To achieve the above object, the present invention provides a UV inkjet printing method providing a printed product with a smooth edge effect. A UV printer having N inkjet heads is provided, M inkjet heads (where N≥M≥1) are controlled to simultaneously to print the same image X on a substrate, and, under a condition that distances between the inkjet heads and the surface of the substrate are kept unchanged, I number of inkjet heads (where N≥I≥1) are controlled to further bi-directionally print the image X for K number of times (where K≥1) at the same position of the surface of the substrate. After completing the above step, under a condition that distances between the inkjet heads and the surface of the substrate are kept unchanged, J number of inkjet heads (where N≥J≥1) are controlled to print an image X' is at the same position as the image X on the substrate, wherein the image X' is a similar image consisting of Z pixels (where Z≥1 pixel) expanded from the image X, such that the image X' completely covers the image X. After all of the above steps are completed, a smooth arc surface is naturally formed around edges of the image X.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
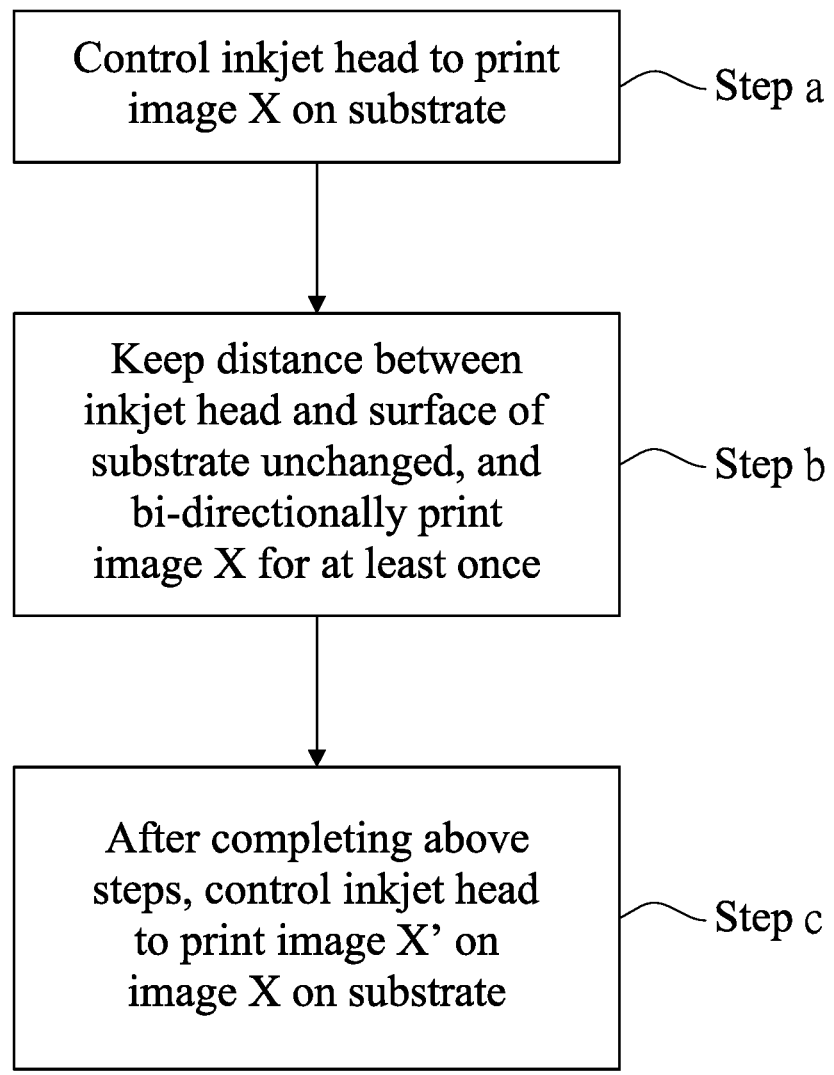
FIG. 1 is a flowchart according to an embodiment of the present invention.
Figure 2:
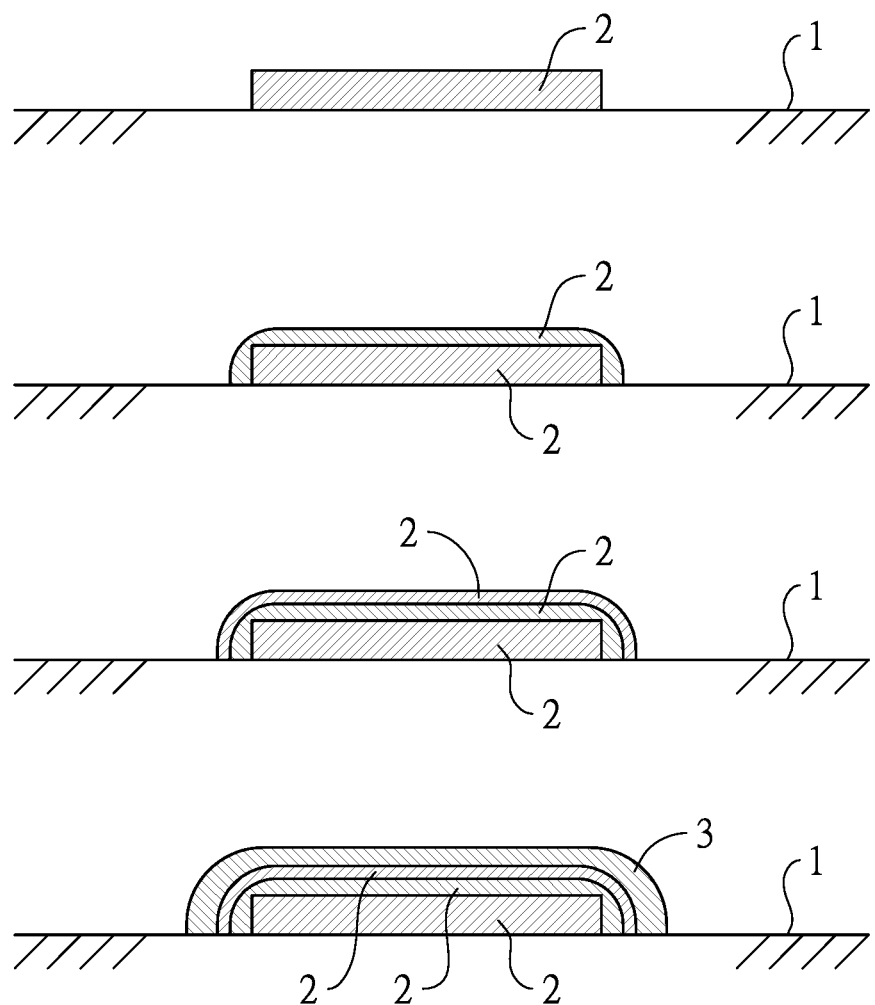
FIG. 2 is a schematic diagram showing states of successive operations in an implementation according to an embodiment of the present invention.

FIG. 1 and FIG. 2 show an ultraviolet (UV) inkjet printing method providing a stacked printing edge with a smooth effect according to a preferred embodiment.

The process of a UV inkjet printing method providing a stacked printing edge with a smooth effect of the present invention includes the following steps.

In step a, an inkjet head is controlled to print an image X is on a substrate.

In step b: a distance between the inkjet head and a surface of the substrate is kept unchanged, and the above image X is printed bi-directionally for at least once.

In step c, after completing the above steps, the inkjet head is again controlled to print an image X' on the image X on the substrate.

The inkjet head is an inkjet head with one single output or multiple outputs. The image X' consists of pixels expanded from the image X, such that the image X' completely covers the image X, forming a smooth arc surface at peripheral edges of the image X.

In implementation, as shown in FIG. 2, a UV printer having N inkjet heads is provided. After a substrate 1 is placed on a printing platform of the UV inkjet printer, M inkjet heads (where N≥M≥1) are controlled to simultaneously print a same image X 2 on the substrate 1, and, under a condition that distances between the inkjet heads and a surface of the substrate 1 are kept unchanged, I number of inkjet heads (where N≥I≥1) are controlled to bi-directionally print the image X 2 at the same position on the substrate 1 for K number of times (where K≥1), such that the image X 2 on the substrate 1 is repeatedly stacked and becomes cured on the substrate 1. After completing the above steps, J number of inkjet heads (where N≥J≥1) are controlled to print an image X' 3 at the same position as the image X 2 on the substrate 1, wherein the image X' 3 is a similar image consisting of pixels expanded from the image X 2, such that the image X' 3 completely covers the peripheral edges of the image X and a smooth arc surface is naturally formed at the peripheral edges of the image X 2.

Thus, with the above design, a smooth arc surface can be formed peripheral edges of the image presented after printing on the substrate. Thus, when the above is applied to a special printed product such as 3D or emboss printing, the product has higher precision and provides a finer feel to a user.

The above description includes details of the embodiment and technical means used in the present invention, and numerous variations and modifications that can be derived on the basis of the disclosure or teaching of the disclosure are regarded as equivalent changes of the concept of the present invention. Further, the effects provided by such variations and modifications do not exceed beyond the substantial spirit covered by the description and drawings, and are to be construed as being encompassed within the technical field of the present invention.

In conclusion, on the basis of the above disclosure, the UV inkjet printing method providing a stacked printing edge with a smooth effect of the present invention achieves the expected object and is thus industrially applicable. Therefore, a patent application is filed accordingly.

What is claimed is:

1. An ultraviolet (UV) inkjet printing method providing a stacked printing edge with a smooth edge effect, comprising:
    step (a): controlling an inkjet head to print an image X on a substrate;
    step (b): keeping a distance between the inkjet head and a surface of the substrate unchanged, and bi-directionally printing the image X for at least once; and
    step (c): after completing the above steps, controlling the same inkjet head used for forming the image X to print an image X' on the image X at a same position as the image X on the substrate;
    wherein, the image X is a multi-color image, and the image X' is a similar multi-color image of the image X and consists of Z pixels expanded from the image X, where $Z \geq 1$ pixel, such that the image X' completely covers the image X, forming a smooth arc surface at peripheral edges of the image X.

2. The UV inkjet printing method providing the stacked printing edge with the smooth effect according to claim 1, wherein the inkjet head is an inkjet head having one single output or multiple outputs.

3. The UV inkjet printing method providing the stacked printing edge with the smooth effect according to claim 1, wherein in step (c), the distance between the inkjet head and the surface of the substrate is kept unchanged as in step (b).

* * * * *